(12) United States Patent
Yun

(10) Patent No.: US 11,938,927 B2
(45) Date of Patent: Mar. 26, 2024

(54) TRACK MERGENCE MODULE AND METHOD

(71) Applicants: HYUNDAI MOTOR COMPANY, Seoul (KR); KIA CORPORATION, Seoul (KR)

(72) Inventor: Bo Young Yun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 202 days.

(21) Appl. No.: 17/513,650

(22) Filed: Oct. 28, 2021

(65) Prior Publication Data
US 2022/0185268 A1 Jun. 16, 2022

(30) Foreign Application Priority Data
Dec. 16, 2020 (KR) .......................... 10-2020-0176344

(51) Int. Cl.
| | |
|---|---|
| *B60W 30/09* | (2012.01) |
| *B60W 30/095* | (2012.01) |
| *G01S 13/931* | (2020.01) |
| *G01S 17/931* | (2020.01) |

(52) U.S. Cl.
CPC ........ *B60W 30/09* (2013.01); *B60W 30/0956* (2013.01); *G01S 13/931* (2013.01); *G01S 17/931* (2020.01); *B60W 2520/10* (2013.01); *B60W 2554/806* (2020.02); *B60W 2754/70* (2020.02); *G01S 2013/9323* (2020.01)

(58) Field of Classification Search
CPC ............ B60W 30/09; B60W 30/0956; B60W 2520/10; B60W 2554/806; B60W 2754/70; B60W 40/02; B60W 40/105; G01S 13/931; G01S 17/931; G01S 2013/9323; G01S 7/4808; G01S 13/726; G01S 13/865; G01S 13/867; G01S 17/86; G01S 7/497; G01S 17/89; G06T 7/292
See application file for complete search history.

(56) References Cited

U.S. PATENT DOCUMENTS

| | | | |
|---|---|---|---|
| 2018/0236985 A1* | 8/2018 | Kim | G06F 16/2365 |
| 2019/0049968 A1* | 2/2019 | Dean | A61G 5/04 |
| 2021/0197861 A1* | 7/2021 | Galoogahi | G06V 20/56 |

* cited by examiner

*Primary Examiner* — Ig T An
(74) *Attorney, Agent, or Firm* — Lempia Summerfield Katz LLC

(57) ABSTRACT

Disclosed are a track mergence module and a method by which track deletion conditions are set to be varied depending on various situations and a track corresponding to the set track deletion conditions is deleted. The track mergence module includes a track deletion condition generation and storage unit, a phenomenon determination unit and a track mergence unit. A track to be deleted may be accurately deleted by generating the track deletion conditions so as to adaptively correspond to the performance of a sensor and various situations in which a host vehicle is placed, thereby being capable of erroneous braking of the autonomously driving host vehicle.

21 Claims, 14 Drawing Sheets

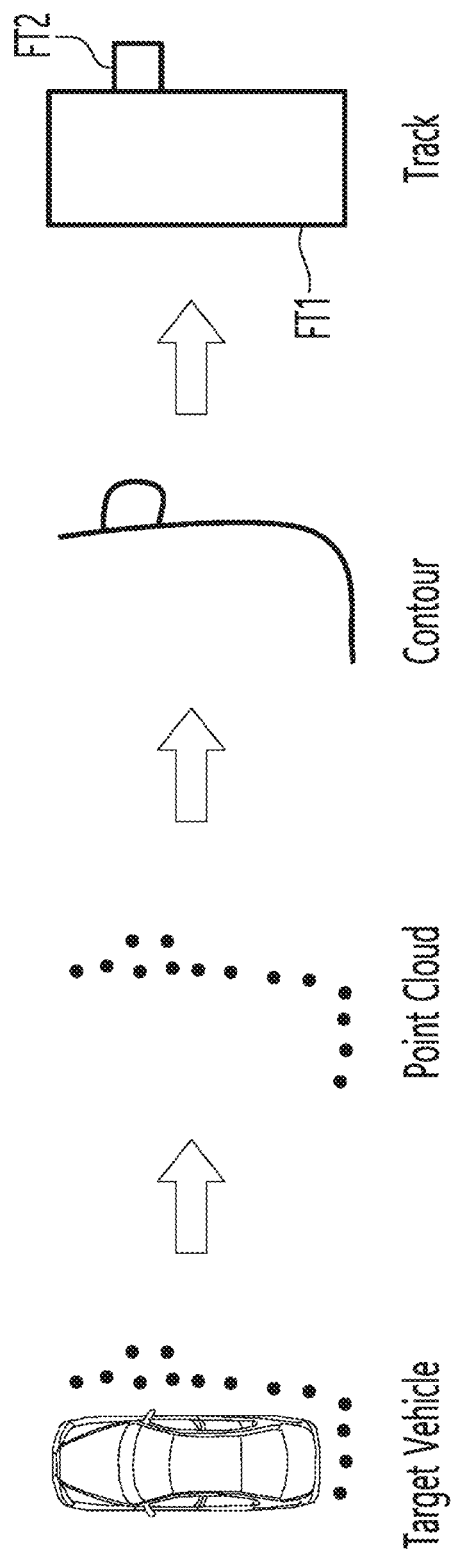

FIG. 12

| Case | FT1 | FT2 | TRACK TO BE DELETED | WHETHER HOST VEHICLE IS CONTROLLED TO TURN |
|---|---|---|---|---|
| 1 | ACTUAL POSITION OF TARGET VEHICLE | FALSE TRACK | FT1 | ACCIDENT OCCURS AFTER HOST VEHICLE TURNS |
| 2 | FALSE TRACK | ACTUAL POSITION OF TARGET VEHICLE | FT1 | NO ACCIDENT OCCURS EVEN WHEN HOST VEHICLE TURNS |
| 3 | ACTUAL POSITION OF TARGET VEHICLE | FALSE TRACK | FT2 | HOST VEHICLE DOES NOT TURN AND NO ACCIDENT OCCURS |
| 4 | FALSE TRACK | ACTUAL POSITION OF TARGET VEHICLE | FT2 | HOST VEHICLE DOES NOT TURN AND NO ACCIDENT OCCURS |

FIG. 13A
FIG. 13B
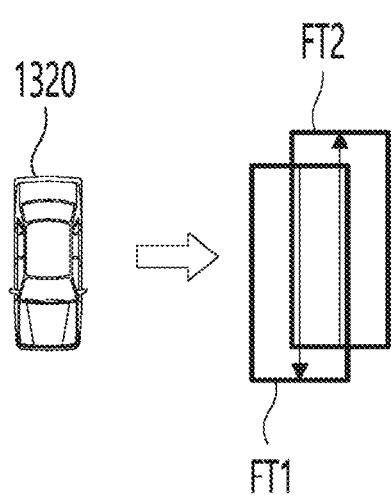
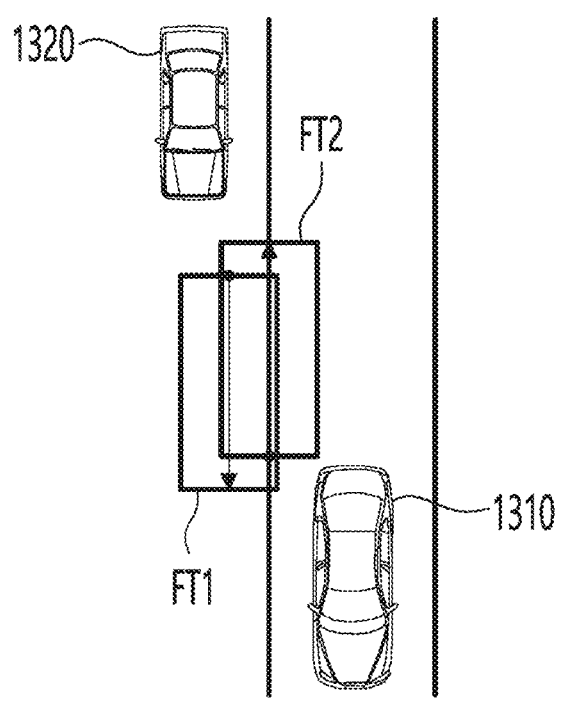

TRACK MERGENCE MODULE AND METHOD

CROSS-REFERENCE TO RELATED APPLICATION

This application claims the benefit of and priority to Korean Patent Application No. 10-2020-0176344, filed on Dec. 16, 2020, the entire contents of which are incorporated herein by reference.

FIELD

The present disclosure relates to track mergence between dynamic object fusion (DOF) and a roof lidar, and more particularly, to a track mergence method and module in which a specific roof lidar-only track is deleted depending on various situations in which a vehicle is placed.

BACKGROUND

The statements in this section merely provide background information related to the present disclosure and do not necessarily constitute prior art.

Sensing units having various functions are mounted in an autonomous vehicle, and the autonomous vehicle detects surrounding vehicles or obstacles around roads through the sensing units and then uses results of the detection to perform autonomous driving. The sensing units include cameras, radar sensors, laser sensors, lidar sensors, etc.

The camera is excellent in object detection and recognition, but is influenced by surrounding environments, such as insufficient illumination at night or fog. The radar sensor does not respond to a stationary object and is not sensitive to a non-metallic object, and has difficulty recognizing pedestrians. The laser sensor is excellent in object detection, but has structural limits in detection of the size of an object, classification of the object and track of the trajectory of the object. The lidar sensor is capable of sensing a distance to a target and the direction, velocity, temperature, material, etc. of the target, but causes reduction in accuracy in signal collection due to scattering of ambient light introduced from a surrounding area.

Recently, in order to improve object detection performance while overcoming limits caused by use of a single sensor, sensor fusion technology has been proposed and is being used. The goal of technical development is to reduce a time taken to perform object recognition even when the number and kinds of sensors used in autonomous driving increase.

SUMMARY

The present disclosure provides a track mergence module and a method that substantially obviate limitations and disadvantages of the related art.

In one form of the present disclosure, a track mergence module sets track deletion conditions varied depending on various situations and deletes a track corresponding to the set track deletion conditions.

Another form of the present disclosure provides a track mergence method by which track deletion conditions are set to be varied depending on various situations and a track corresponding to the set track deletion conditions is deleted.

Additional advantages, objects, and features of the present disclosure are set forth in part in the description which follows and in part will become apparent to those having ordinary skill in the art upon examination of the following, or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a track mergence module includes: a track deletion condition generation and storage unit, a phenomenon determination unit and a track mergence unit. The track deletion condition generation and storage unit generates and stores track deletion conditions corresponding to a plurality of phenomena. The phenomenon determination unit determines which one of the phenomena corresponds to a current situation by analyzing a plurality of received sensor fusion tracks. The track mergence unit deletes a corresponding one of the fusion tracks by retrieving the deletion track conditions corresponding to the phenomenon, determined by the phenomenon determination unit, from the track deletion condition generation and storage unit.

In another aspect of the present disclosure, a track mergence module includes generating track deletion conditions corresponding to a plurality of predetermined phenomena, respectively, and storing the generated track deletion conditions, determining which one of the phenomena a current situation corresponds to by analyzing a plurality of received tracks, retrieving the track deletion conditions corresponding to the determined phenomenon among the stored track deletion conditions corresponding to the phenomena, and deleting a single track or a fusion track corresponding to the track deletion conditions.

It is to be understood that both the foregoing general description and the following detailed description of the present disclosure are exemplary and explanatory and are intended to provide further explanation of the present disclosure.

BRIEF DESCRIPTION OF THE DRAWINGS

In order that the disclosure may be well understood, there will now be described various forms thereof, given by way of example, reference being made to the accompanying drawings, in which:

FIG. 7 is a view illustrating a process for processing data collected using a roof lidar sensor;

FIG. 12 is a table representing the number of cases of the third phenomenon;

FIGS. 13A and 13B are views illustrating a fourth phenomenon; and

Figure 1:
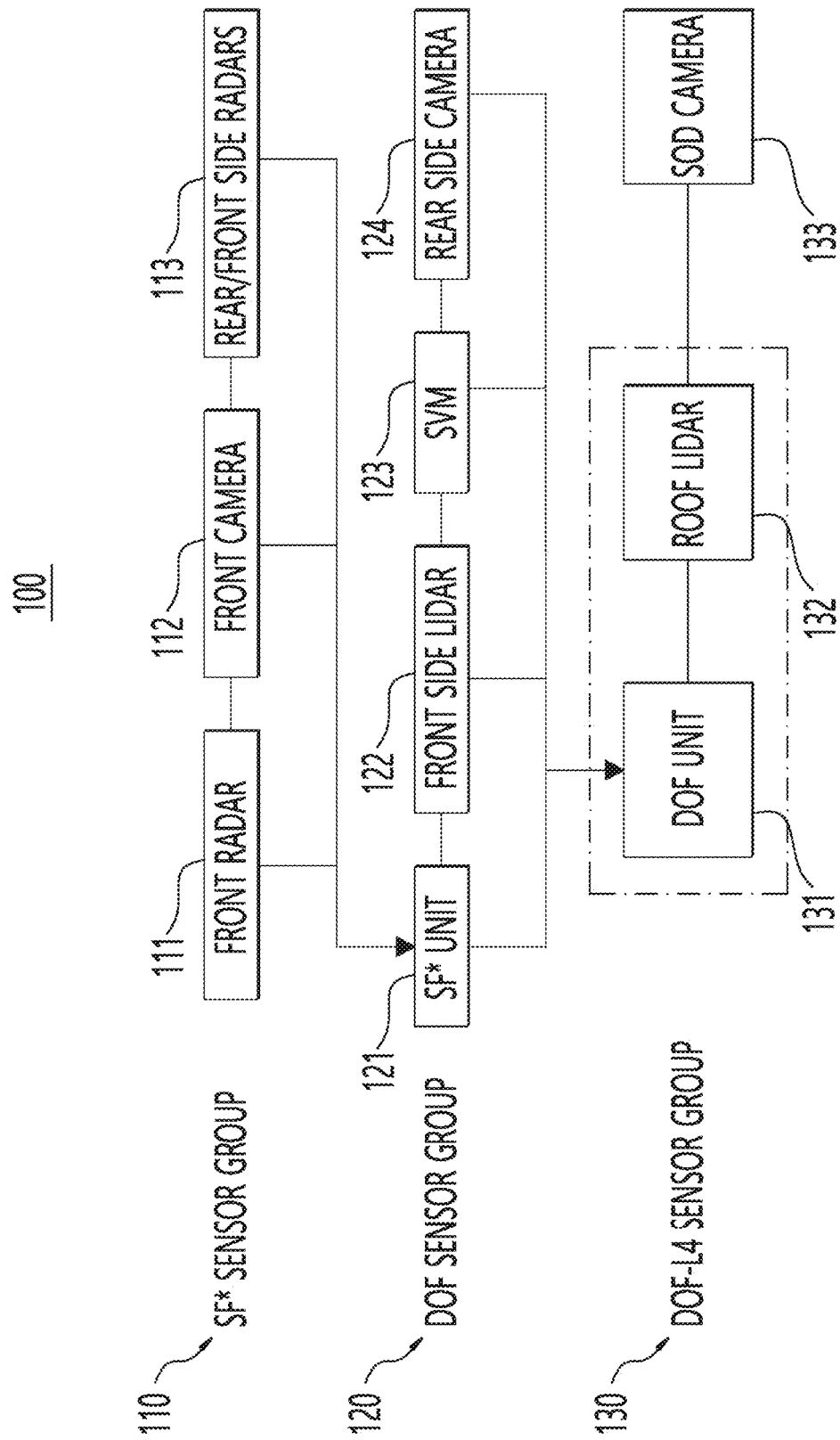
FIG. 1 is a block diagram illustrating a plurality of sensor groups.

The drawings described herein are for illustration purposes only and are not intended to limit the scope of the present disclosure in any way.

DETAILED DESCRIPTION

Reference is now made in detail to exemplary embodiments of the present disclosure, examples of which are illustrated in the accompanying drawings.

The disclosure of the present disclosure is not limited to the embodiments set forth herein and may be variously modified. In the drawings, the same or similar elements are denoted by the same reference numerals even when they are depicted in different drawings.

It should be understood that every element of the forms is not described herein, and general content in the technical field to which the present disclosure pertains or overlapping parts between forms are not described herein. As used herein, the terms "unit", "module", and "block" may be implemented as software or hardware (e.g., a processor), and a plurality of units, modules, or blocks may be integrated into one element or one unit, module, or block may include a plurality of elements in accordance with embodiments.

FIG. 1 is a block diagram illustrating a plurality of sensor groups.

Referring to FIG. 1, a sensor fusion assembly 100 may be divided into three sensor groups, i.e., an SF* sensor group 110, a DOF sensor group 120, and a DOF-L4 sensor group 130. The SF* sensor group 110 includes a front radar 111, a front camera 112 and rear/front side radars 113, and the DOF sensor group 120 includes a collector (SF* unit) 121 configured to collect information sensed by the SF* sensor group 110, a front side lidar 122, a surround view monitor (SVM) 123 and a rear side camera 124. The DOF-L4 sensor group 130 includes a DOF unit 131 configured to collect information sensed by the DOF sensor group 120, a roof lidar 132 and a surround object detection (SOD) camera 133.

Figure 2:
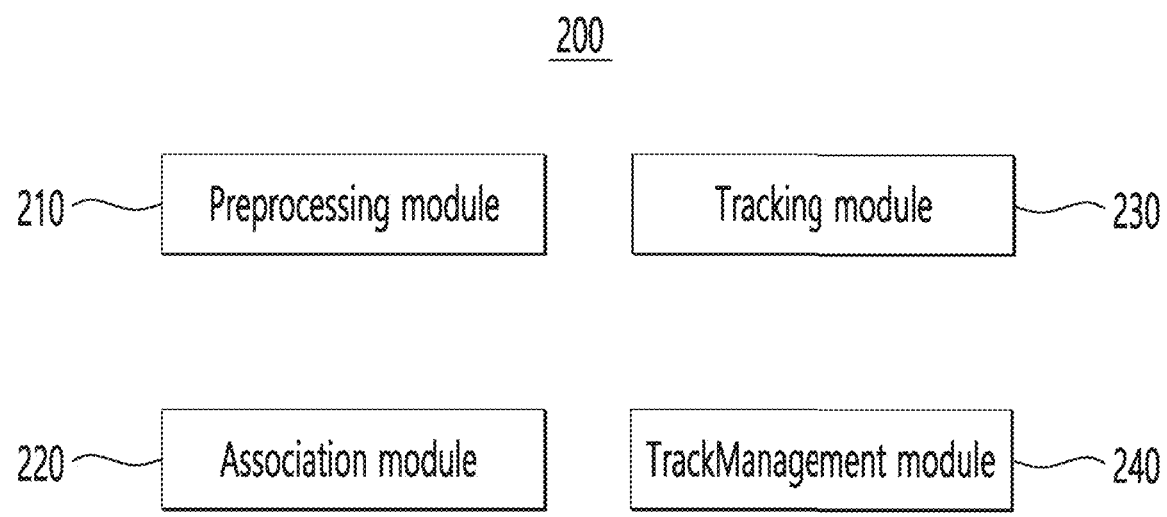
FIG. 2 is a block diagram illustrating the configuration of a sensor fusion system.

FIG. 2 is a block diagram illustrating the configuration of a sensor fusion system.

Referring to FIG. 2, a sensor fusion system 100 generally includes a preprocessing module 210, an association module 220, a tracking module 230 and a track management module 240.

Figure 3:
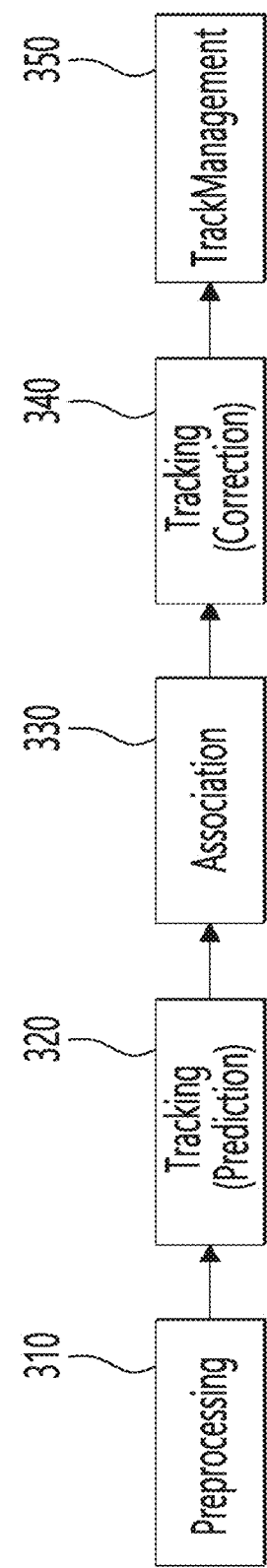
FIG. 3 is a flowchart representing one example of a sensor fusion process.

FIG. 3 is a flowchart representing one example of a sensor fusion process.

Referring to FIGS. 2 and 3, a sensor fusion process (300) includes: preprocessing, by the preprocessing module 210, sensed signals collected from a plurality of sensors (referred to as step 310); predicting, by the tracking module 230, data acquired in the preprocessing step 310 (referred to as step 320); determining, by the association module 220, association among data acquired in the predicting step 320 (see, step 330); correcting, by the tracking module 230, the data on which determination as to association is terminated in the determining step 330 (referred to as step 340); and performing, by the track management module 240, track management so as to generate, manage and extinguish a sensor fusion track based on the corrected data (referred to as step 350).

A track mergence module (not shown) constructing the track management module 230 performs, when a plurality of sensor fusion tracks with respect to one target object is formed, a function of deleting a sensor fusion track obstructing normal autonomous driving control of a vehicle among the sensor fusion tracks.

When an additionally generated roof lidar track FT2 rather than the actual fusion track FT1 of the target vehicle is not deleted, erroneous recognition and erroneous control due to the erroneous recognition may be generated.

Figure 4:
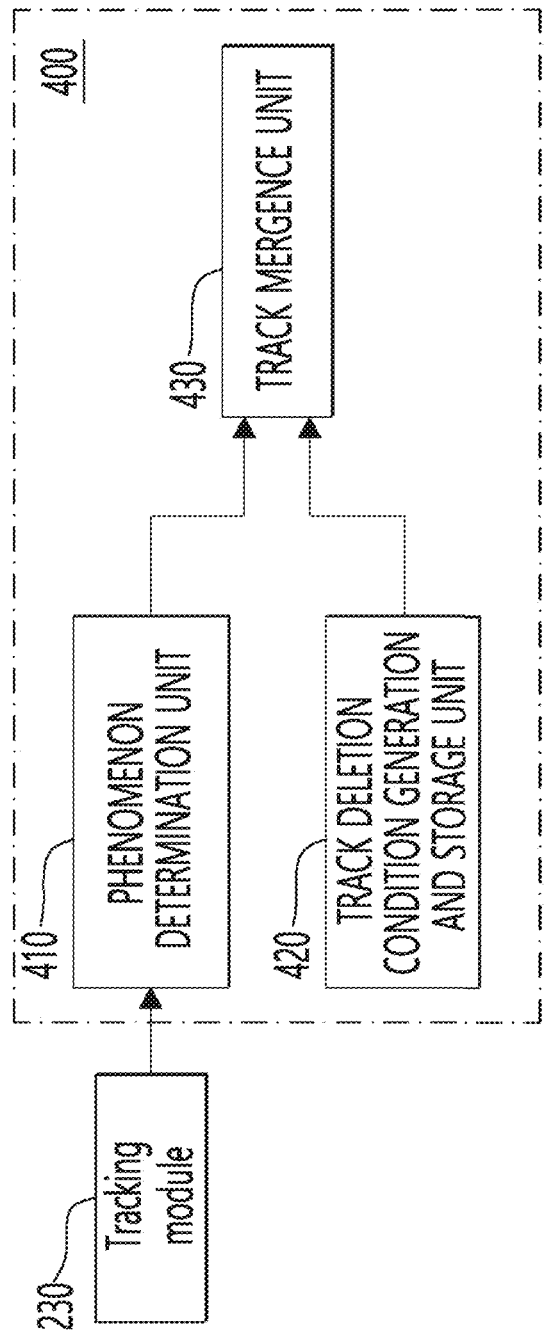
FIG. 4 is a block diagram of a track mergence module according to one embodiment of the present disclosure.

FIG. 4 is a block diagram of a track mergence module according to one embodiment of the present disclosure.

Referring to FIG. 4, a track mergence module according to the present disclosure includes a phenomenon determination unit 410, a track deletion condition generation and storage unit 420, and a track mergence unit 430.

The phenomenon determination unit 410 determines which one of a plurality of phenomena a current situation corresponds to by analyzing a plurality of sensor fusion tracks output from the tracking module 230 of the sensor fusion system 200. Among the phenomena, a first phenomenon indicates a situation in which a roof lidar track having a small size with respect to one target is additionally generated, a second phenomenon indicates a situation in which an unstable false roof lidar track is generated, a third phenomenon indicates a situation in which two sensor fusion tracks having heading angles parallel to each other overlap each other, and a fourth phenomenon indicates a situation in which two sensor fusion tracks having heading angles in opposite directions overlap each other.

The track deletion condition generation and storage unit 420 generates and stores track deletion conditions corresponding to the four phenomena.

The track mergence unit 430 retrieves the track deletion conditions corresponding to the phenomenon, determined by the phenomenon determination unit 410, from the track deletion condition generation and storage unit 420, and deletes a corresponding track among a plurality of received tracks.

Figure 5:
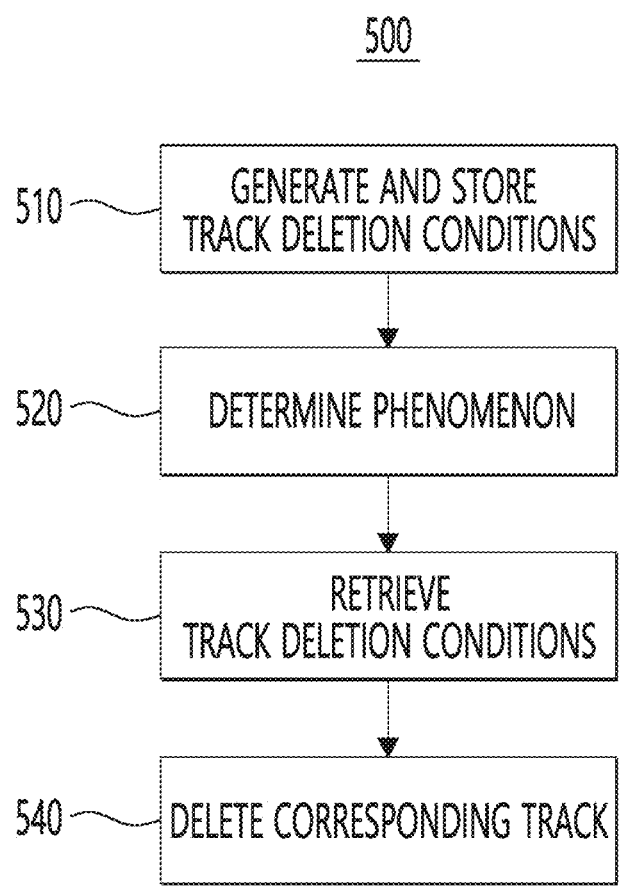
FIG. 5 is a flowchart representing a track mergence method according to one embodiment of the present disclosure.

FIG. 5 is a flowchart representing a track mergence method according to one embodiment of the present disclosure.

Referring to FIG. 5, a track mergence method (500) according to one form of the present disclosure includes: generating and storing track deletion conditions (referred to as step 510), determining a phenomenon (referred to as step 520), retrieving the track deletion conditions (referred to as step 530), and deleting a corresponding track (referred to as step 540).

In generation and storage of the track deletion conditions (step 510), the track deletion condition generation and storage unit 420 generates and stores track deletion conditions corresponding to a plurality of predetermined situations, respectively.

In determination of the phenomenon (step 520), the phenomenon determination unit 410 determines which one of a plurality of phenomena a current situation corresponds to by analyzing a plurality of sensor fusion tracks output from the tracking module 230 of the sensor fusion system 200. Among the predetermined situations, the first phenomenon indicates a situation in which a roof lidar track having a small size with respect to one target is additionally generated, the second phenomenon indicates a situation in which an unstable false roof lidar track is generated, the third phenomenon indicates a situation in which two sensor fusion tracks having heading angles parallel to each other overlap each other, and the fourth phenomenon indicates a situation in which two sensor fusion tracks having heading angles in opposite directions overlap each other.

In retrieval of the track deletion conditions (step 530), the track mergence unit 430 retrieves the track deletion conditions corresponding to the phenomenon, determined by the phenomenon determination unit 410, among the track deletion conditions corresponding to the predetermined phenomena stored the track deletion condition generation and storage unit 420.

In deletion of the corresponding track (step 540), the track mergence unit 430 deletes a corresponding single track or fusion track by applying the track deletion conditions to the sensor fusion tracks output from the tracking module 230 of the sensor fusion system 200.

Among the above-described four phenomena, features in each phenomenon and the conditions of a track to be deleted in each phenomenon are described below.

Figure 6:
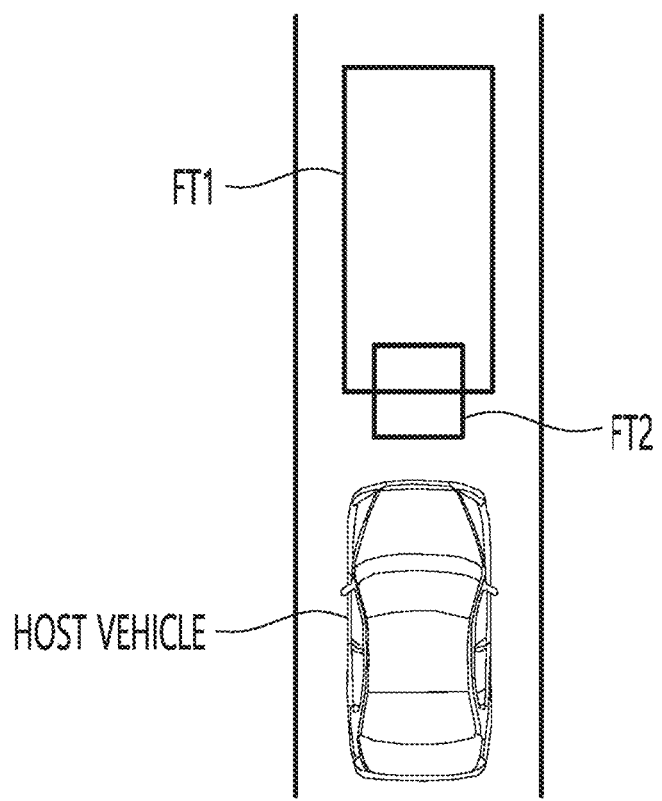
FIG. 6 is a view illustrating a first phenomenon.

FIG. 6 is a view illustrating the first phenomenon.

Referring to FIG. 6, the first phenomenon, indicating a situation in which a roof lidar track having a small size with respect to one target is additionally generated, is defined as a case that, assuming that the target is a vehicle, at least one roof lidar-only track FT2 is additionally generated other than a fusion track FT1 due to DOF with respect to one vehicle, and may occur in a vehicle having a curved shape, such as a side mirror of a vehicle, a bicycle or skis loaded on a vehicle, luggage loaded into a truck or a trailer, or a special vehicle (for example, a trailer).

For convenience of description, it is assumed that the actual fusion track of a vehicle is defined as FT1 and a single track corresponding to luggage loaded into or attached to the vehicle, such as a side mirror or a bicycle, other than a vehicle main body is defined as FT2. That is, FT1 indicates a fusion track generated by the DOF unit 131, and FT2 indicates a roof lidar-only track generated by the roof lidar 132.

The first phenomenon occurs due to the characteristics of the roof lidar 132.

FIG. 7 is a view illustrating a process for processing data collected using a roof lidar sensor.

Referring to FIG. 7, it may be confirmed that the roof lidar sensor (hereinafter, referred to as a roof lidar) mounted in a vehicle transmits light to a target vehicle, collects light reflected by the target vehicle, converts the collected light into a point cloud, and finally acquires a roof lidar track from the contour of the point cloud.

It may be confirmed that, when the roof lidar is applied to an object, i.e., a vehicle, in addition to one fusion track FT1 representing the contour of the vehicle, another roof lidar-only track FT2 generated by a curved shape, such as a side mirror of the vehicle, a bicycle or skis loaded in the vehicle, special luggage (for example, an excavator) loaded in a truck or a trailer, etc.

In the first phenomenon, deletion variables for the roof lidar-only track FT2, which must be deleted, among a plurality of tracks, are as below:

A: FT1 corresponds to a commercial vehicle (CV) also used as a passenger vehicle (PV), B: FT1 corresponds to a passenger vehicle or a commercial vehicle also used as a passenger vehicle, having a height equal to or greater than 1.5 m, C: FT2 is a combined roof lidar-only track, D: FT2 has a length and a width which are equal to or less than 1 m, and E: FT2 does not corresponds to a pedestrian (Ped), a person riding a bicycle (Cyc), and a powered two wheeler (PTW).

A first track deletion condition C_11 formed by combining the above-described five variables is expressed by the following Equation:

$$C\_11 = (A \cup B) \cap C \cap D \cap E$$

Whether or not the roof lidar-only track FT2 satisfying the first track deletion condition C_11 satisfies a second track deletion condition C_12, i.e., a deletion condition for the position of the roof lidar-only track FT2, is additionally determined.

The second track deletion condition C_12 is whether the roof lidar-only track FT2 satisfying the first track deletion condition C_11 is located in a comparison area generated by expanding the fusion track FT1 by designated distances in the length direction and the width direction.

A length increase ΔL and a width increase ΔW may be calculated by the following Equations:

$$\Delta L = L\_ft1 \times 1.2,$$

$$\Delta W = W\_ft1 \div 2$$

When the position of the center of one surface of the roof lidar-only track FT2 satisfying the first track deletion condition C_11 is within the comparison area having a length of 1.2 times that of the actual fusion track FT1 of a vehicle in the length direction of the fusion track FT1 and a width of ½ that of the fusion track FT1 in the width direction fusion track FT1, as defined as the second track deletion condition C_12, the roof lidar-only track FT2 may be determined as a target to be finally deleted. The comparison area having a generated by expanding the fusion track FT1 by ½ the width of the fusion track FT1 in the width direction thereof actually becomes the same area as the fusion track FT1.

Figure 8A:
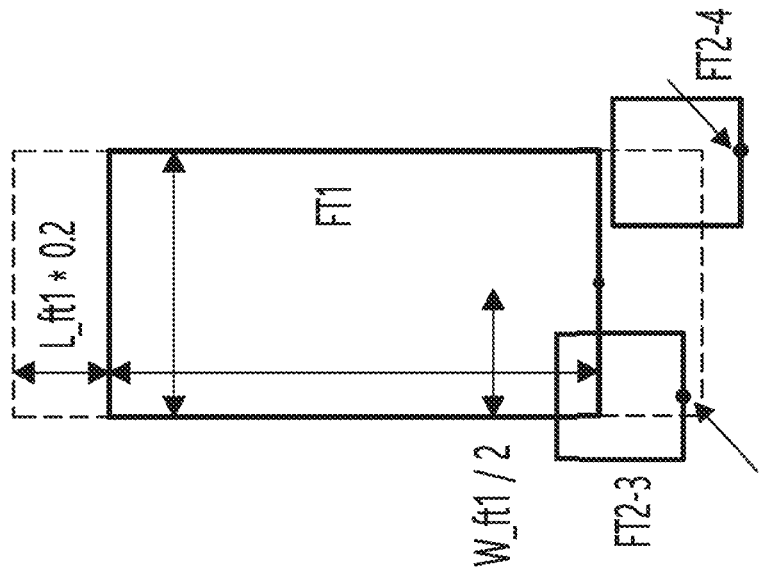
FIGS. 8A and 8B are views respectively illustrating a case that a track is deleted in the first phenomenon and a case that a track is not deleted in the first phenomenon.
Figure 8B:
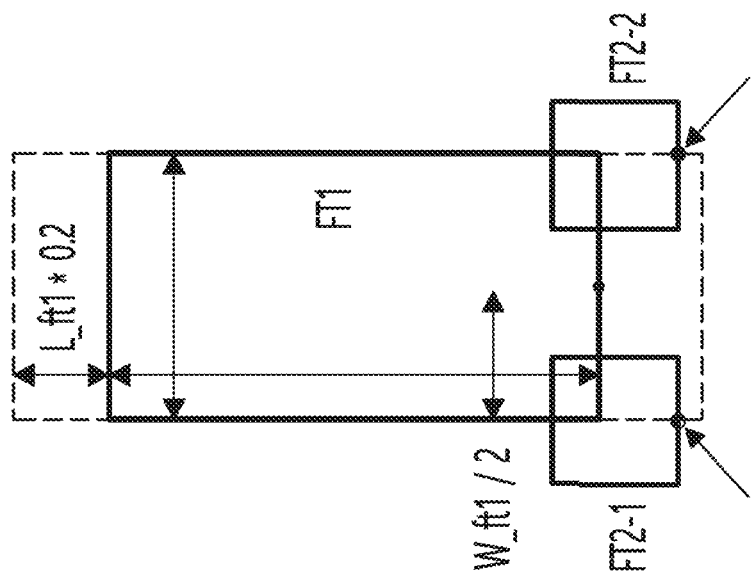

FIGS. 8A and 8B are views illustrating a case that a track is deleted in the first phenomenon and a case that a track is not deleted in the first phenomenon.

When the central part (indicated by a red arrow) of the rear surface of a roof lidar-only track FT2 satisfying the first track deletion condition C_11 is included in an area indicated by a dotted line as a reference for satisfying the second track deletion condition C_12, the roof lidar-only track FT2 becomes a target to be deleted.

Referring to FIG. 8A, when the central part (indicated by a red arrow) of the rear surface of a roof lidar-only track FT2 satisfying the first track deletion condition C_11 is located on the dotted line, the roof lidar-only track FT2 may be deleted or may not be deleted according to embodiments.

Referring to FIG. 8B, when the central part (indicated by a red arrow) of the rear surface of a roof lidar-only track FT2 satisfying the first track deletion condition C_11 is located outside the area indicated by the dotted line, the roof lidar-only track FT2 is not a target to be deleted.

As described above, there is a possibility of recognizing luggage having a designated length and a designated width as a vehicle because of characteristics of the roof lidar and, in the present disclosure, erroneous recognition of the luggage as the vehicle may be prevented by eliminating this possibility.

Figure 9:
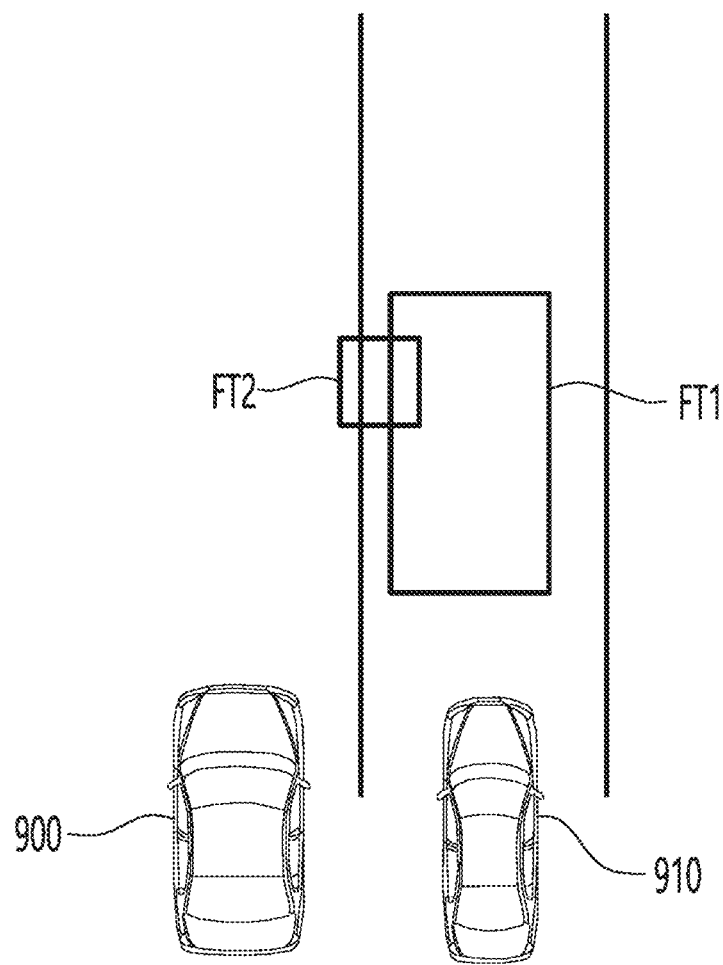
FIG. 9 is a view illustrating the first phenomenon occurring when a host vehicle drives in a designated lane and a target vehicle drives in an adjacent lane.

FIG. 9 is a view illustrating the first phenomenon occurring when a host vehicle drives in a designated lane and a target vehicle drives in an adjacent lane.

Referring to FIG. 9, among two tracks FT1 and FT2 of a target vehicle 910 driving in a lane adjacent to a lane in which a host vehicle 990 drives, when this situation is determined only based on the actual fusion track FT1 of the target vehicle 910, it is determined that the target vehicle 910 driving in the adjacent lane does not deviate from the adjacent lane but, when this situation is determined based on the roof lidar-only track FT2 in addition to the actual fusion track FT1 of the target vehicle 910, it is determined that the target vehicle 910 driving in the adjacent lane invades the drive lane of the host vehicle 900, and thereby, the host vehicle 900 is autonomously braked and may thus cause erroneous braking.

In the present disclosure, even in a situation in which the first phenomenon occurs, it is determined that the target vehicle 910 driving in the adjacent lane does not deviate from the adjacent lane and thus the host vehicle 900 may not be braked.

Figure 10:
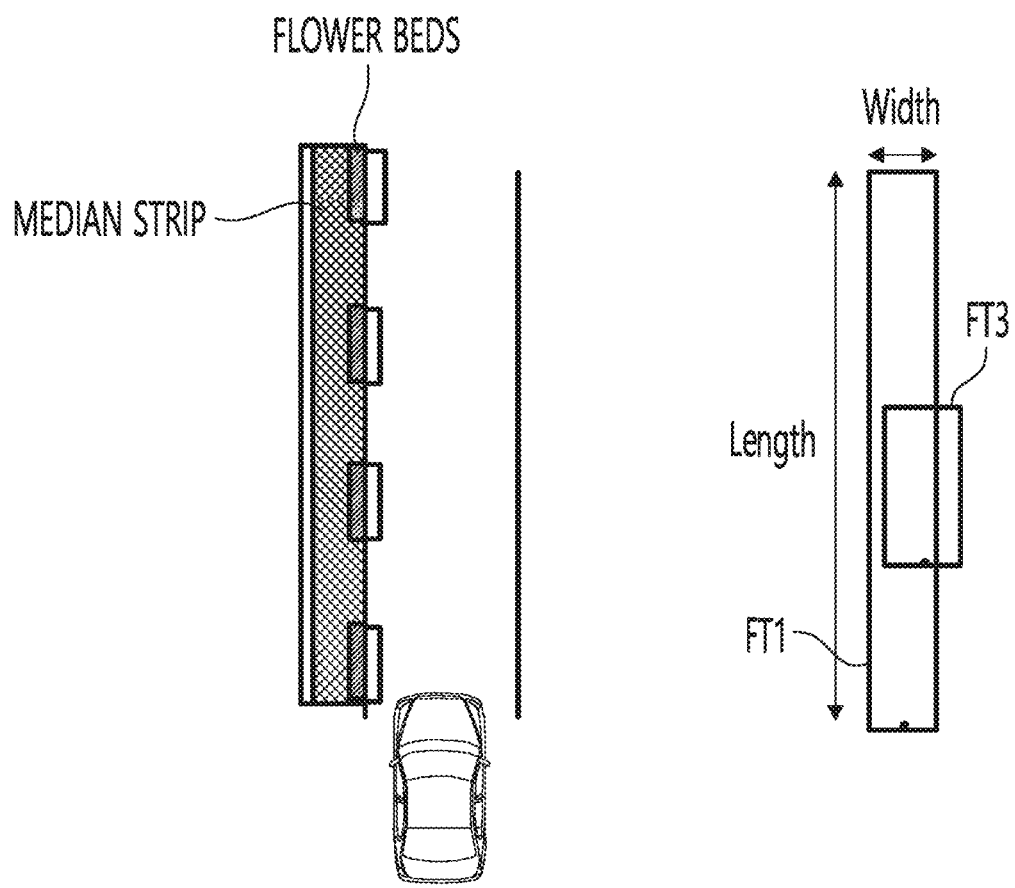
FIG. 10 is a view illustrating a second phenomenon.

FIG. 10 is a view illustrating the second phenomenon.

Referring to FIG. 10, the second phenomenon, indicating a situation in which an unstable false roof lidar track is generated due to a stationary object around a road, for example, a guardrail, a traffic cone, a traffic lane regulation rod, a bush or a tree, may occur, for example, in a case that flower beds are created in a median strip installed at the center of the road between two sides thereof.

Because a roof lidar is a point cloud-based sensor, velocity extraction at each point is inaccurate, and thus, the velocity information of the track thereof may also be inaccurate and a plurality of unstable false roof lidar tracks may be repeatedly generated and disappear due to instability in recognition. Considering that, in a situation in which there are many stationary objects around a road, relatively many false roof lidar tracks are generated and thus a plurality of fusion tracks overlapping each other is generated, the present disclosure proposes the following track deletion conditions.

In the second phenomenon, deletion variables of a false roof lidar track FT3, which must be deleted, among a plurality of tracks, are as below:
  A: FT1 is a combined roof lidar-only fusion track, and
  B: FT2 indicates that there are none of combined roof lidars.

Here, the deletion variable B means that, when an unstable false roof lidar track FT3 is generated and then disappears, there is no sensor to constitute the track FT3 and thus there are none of combinations.

A first track deletion condition C_21 of the second phenomenon formed by combining the above-described two variables is expressed by the following Equation:

$$C\_21 = A \cap B.$$

A second track deletion condition C_22 is whether the roof lidar-only track FT2 satisfying the first track deletion condition C_21 is located in a comparison area generated by expanding the fusion track FT1 by designated distances in the length direction and the width direction.

A length increase ΔL and a width increase ΔW may be calculated by the following Equations:

$$\Delta L = L\_ft1 \times 1.2$$

$$\Delta W = W\_ft1 \div 2.$$

When the position of the center of one surface of the roof lidar-only track FT2 satisfying the first track deletion condition C_21 is within the comparison area having a length of 1.2 times that of the fusion track FT1 in the length direction of the actual fusion track FT1 of the vehicle and a width of ½ that of the fusion track FT1 in the width direction of the fusion track FT1, as defined as the second track deletion condition C_22, the roof lidar-only track FT2 may be determined as a target to be finally deleted.

Figure 11A:
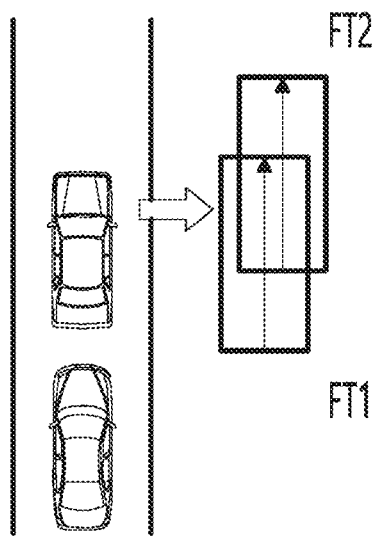
FIGS. 11A and 11B are views illustrating a third phenomenon.
Figure 11B:
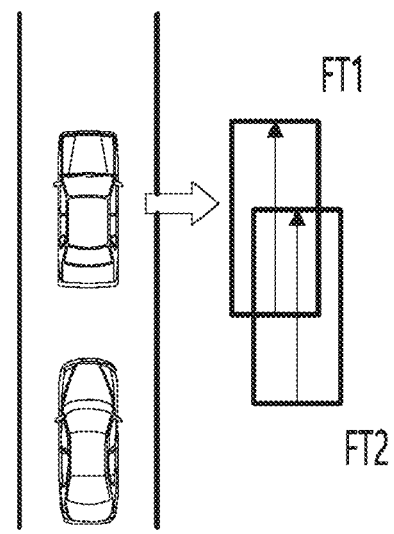

FIGS. 11A and 11B are views illustrating the third phenomenon.

FIG. 11A illustrates a case that a fusion track FT2 is located in front of another fusion track FT1, and FIG. 11A illustrates a case that the fusion track FT1 is located in front of the fusion track FT2.

Referring to FIGS. 11A and 11B, in the third phenomenon indicating a situation in which two sensor fusion tracks having heading angles parallel to each other overlap each other, when two fusion tracks FT1 and FT2 are generated and overlap each other because the fusion track of a vehicle 120 driving in front of a host vehicle 1100 due to DOF and the roof lidar-only track generated by a roof lidar of the vehicle 120 are not associated with each other due to a position difference therebetween, one of the two fusion tracks FT1 and FT2 is selected and is deleted by the track mergence unit 430.

First, when the ratio of an overlap area between the two fusion tracks FT1 and FT2 not exceeds 40% of the area of each of the fusion tracks FT1 and FT2, the fusion tracks FT1 and FT2 are regarded as indicating different vehicles, and when the ratio of the overlap area exceeds 40% of the area of each of the fusion tracks FT1 and FT2, it is determined that this situation is included in the third phenomenon.

In the third phenomenon, deletion variables of a fusion track, which must be deleted, among a plurality of tracks, are as below:
  A: Longitudinal position of FT1>0,
  B: Longitudinal position of FT2≤(longitudinal position of FT1+length of FT1),
  C: Longitudinal position of FT2>longitudinal position of FT1,
  D: Longitudinal position of FT1<0,
  E: Longitudinal position of FT1≤(longitudinal position of FT2+length of FT2), and
  F: Longitudinal position of FT1≥longitudinal position of FT2.

Here, a longitudinal direction means the same direction as the driving direction of a vehicle.

A first track deletion condition C_31 formed by combining the above-described six variables is expressed by the following Equation:

$$C\_31 = (A \cap B \cap C) \cup (D \cap E \cap F).$$

Whether or not the fusion track FT2 satisfying the first track deletion condition C_31 satisfies a second track deletion condition C_32, i.e., a deletion condition for the position of the fusion track FT2, is additionally determined.

The second track deletion condition C_32 is whether the roof lidar-only track FT2 satisfying the first track deletion condition C_31 is located in a comparison area generated by expanding the fusion track FT1 by designated distances in the length direction and the width direction.

A length increase ΔL and a width increase ΔW may be calculated by the following Equations:

$$\Delta L = L\_ft1 \times 1.05 \times 0.6, \text{ and}$$

$$\Delta W = W\_ft1 \div 2$$

When the position of the center of one surface of the roof lidar-only track FT2 satisfying the first track deletion condition C_31 is within the comparison area having a length of 1.05×0.6 times that of the fusion track FT1 in the length direction of the actual fusion track FT1 of the vehicle and a width of ½ that of the fusion track FT1 in the width direction of the fusion track FT1, as defined as the second track deletion condition C_32, the roof lidar-only track FT2 may be determined as a target to be finally deleted.

FIG. 12 is a table representing the number of cases of the third phenomenon.

Referring to FIG. 12, Case 1 and Case 2 correspond to FIG. 11A, and Case 3 and Case 4 correspond to FIG. 11B.

Referring to FIG. 12, because a target to be deleted is one of the fusion tracks FT1 and FT2, it may be confirmed that no accident occurs when the fusion track FT2 is deleted, through the table in which whether or not an accident occurs depending on the current positions of the fusion tracks FT1 and FT2 when one of the fusion tracks FT1 and FT2 is deleted is arranged.

First, referring to Case 3 and Case 4, when the fusion track FT2 is deleted, no accident occurs regardless of the positions of the fusion tracks FT1 and FT2 and whether or not the host vehicle turns. In Case 3 and Case 4, the actual fusion track FT1 of a vehicle is not deleted, the host vehicle does not turn due to presence of the fusion track FT1 and thus no accident occurs (Case 3), and the fusion track FT1 becomes a target to determine whether the host vehicle turns and thus no accident occurs (Case 4). Even when the fusion track FT1 is deleted, the fusion track FT2 becomes the actual fusion track of the vehicle, and thus, no accident occurs even when the host vehicle turns.

When the fusion track FT1 corresponding to the actual fusion track of the vehicle is deleted (Case 1), the fusion track FT2 is far away from the host vehicle 1100 and thus the host vehicle 1100 tries to turn, and therefore, it may be expected that an accident occurs unless other measures are taken immediately after turning.

Therefore, referring to FIGS. 11A and 11B and FIG. 2, when, among the two fusion tracks FT1 and FT2, the fusion track FT2 is deleted, it is obvious that no accident occurs regardless of whether or not the host vehicle 1100 turns, and therefore, it may be confirmed that, upon determining that the third phenomenon occurs, it is appropriate to delete the fusion track FT2.

FIGS. 13A and 13B are views illustrating the fourth phenomenon.

Referring to FIGS. 13A and 13B, the fourth phenomenon, indicating a situation in which two sensor fusion tracks having heading angles in opposite directions overlap each other, occurs when fusion tracks FT1 and FT2 of a vehicle 1320 driving in front of a host vehicle 1310 are not associated with each other due to a rear bumper central position difference between the fusion tracks FT1 and FT2.

Angle signals which may be output from sensors are a signal regarding a heading angle and a signal regarding a course angle. The heading angle is an angle to the shape of a track, and the course angle is an angle to the velocity of the track. The angle signal of a roof lidar is heading angle information to the shape signal of a vehicle. The heading angle information represents the driving direction of the vehicle. A fusion track to be deleted from the moving direction of the target vehicle 1320 located in front of, behind or aside the host vehicle 1310 is determined depending on the driving direction of the host vehicle 1310. That is, erroneous braking of the host vehicle 1310 autonomously driving may be prevented by deleting a false track FT2 displayed as approaching the host vehicle 1310 during driving of the host vehicle 1310.

A deletion condition is to determine whether there is consistency between angle and absolute velocity, and the absolute velocity output from the oncoming target vehicle 1320 must be less than zero (0). Therefore, in the fourth phenomenon, when the absolute velocity output from the oncoming target vehicle 320 exceeds 0, it is determined that there is no consistency between angle and absolute velocity, and it is determined that a corresponding track is inaccurate.

In the fourth phenomenon, deletion variables of a fusion track, which must be deleted, among a plurality of tracks, are as below:

A: Absolute longitudinal velocity of target (FT2)≤0 heading angle of FT2=from −40 degrees to 40 degrees, and B: Absolute longitudinal velocity of target (FT2)>0 (heading angle of FT2≤140 degrees OR heading angle of FT2≥140 degrees)

Here, the longitudinal velocity means a velocity in the driving direction of the host vehicle 1310, and the absolute longitudinal velocity does not mean the relative velocity of the target vehicle 1320 to the host vehicle 1310 but means the absolute velocity of the target vehicle 1320 driving in the same direction as the host vehicle 1310.

A first track deletion condition C_41 formed by combining the above-described two variables is expressed by the following Equation:

$$C\_41 = A \cap B.$$

Whether or not the fusion track FT2 satisfying the first track deletion condition C_41 satisfies a second track deletion condition C_42, i.e., a deletion condition for the position of the fusion track FT2, is additionally determined.

The second track deletion condition C_42 is whether the fusion track FT2 satisfying the first track deletion condition C_41 is located in a comparison area generated by expanding the fusion track FT1 by designated distances in the length direction and the width direction.

A length increase $\Delta L$ and a width increase $\Delta W$ may be calculated by the following Equations:

$$\Delta L = L\_ft1 + (L\_ft2 \times 0.5), \text{ and}$$

$$\Delta W = W\_ft1 \div 2.$$

Here, L_ft2 means the length of the fusion track FT2.

Figure 14:
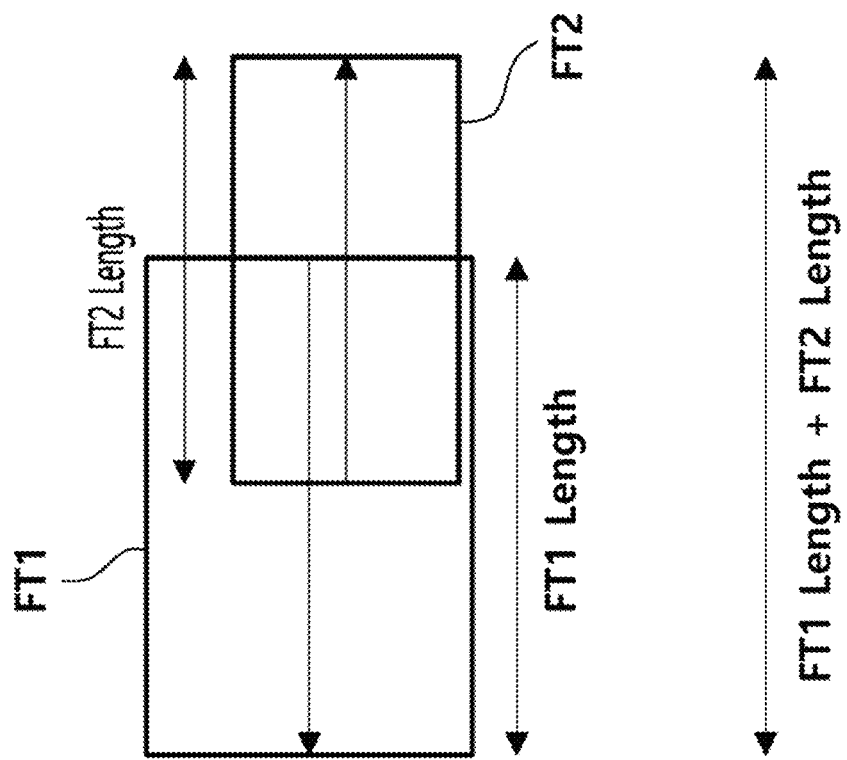
FIG. 14 is a view illustrating an example of two fusion tracks acquired by applying the equations of the fourth phenomenon.

FIG. 14 is a view illustrating an example of two fusion tracks acquired by applying the equations of the fourth phenomenon.

Referring to FIG. 14, when the position of the center of one surface of the roof lidar-only track FT2 satisfying the first track deletion condition C_41 is within the comparison area having a length acquired by adding 0.5 times the length of the roof lidar-only track FT2 in the length direction thereof to the length of the actual fusion track FT1 of the vehicle and a width of ½ that of the fusion track FT1 in the width direction thereof, as defined as the second track deletion condition C_42, the roof lidar-only track FT2 may be determined as a target to be finally deleted.

The present disclosure described as shown in FIG. 5 may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid-state drive (SSD), a silicon disk drive (SDD), a ROM, a RAM, a CD-ROM, a magnetic tape, a floppy disk, an optical data storage device, etc.

As is apparent from the above description, in a track mergence module and method according to the present disclosure, a track to be deleted may be accurately deleted by generating track deletion conditions adaptively corresponding to various situations in which a host vehicle is placed, thereby being capable of preventing a vehicle collision and erroneous braking of the host vehicle and being easily used in development of a human machine interface (HMI).

It would be apparent to those having ordinary skill in the art that various modifications and variations can be made in the present disclosure without departing from the spirit or scope of the present disclosure. Thus, it is intended that the present disclosure cover the modifications and variations of this present disclosure provided they come within the scope of the appended claims and their equivalents.

What is claimed is:

1. A track mergence module comprising:
a track deletion condition generation and storage unit configured to generate and store track deletion conditions corresponding to a plurality of phenomena;
a phenomenon determination unit configured to determine a phenomenon, among the plurality of phenomena, corresponding to a current situation by analyzing a plurality of sensor fusion tracks; and
a track mergence unit configured to delete a sensor fusion track among the plurality of sensor fusion tracks based on a track deletion condition which is selected among the stored track deletion conditions and corresponds to the determined phenomenon,
wherein the phenomenon determination unit is configured to determine that the current situation corresponds to one of:
a first phenomenon associated with a situation in which a roof lidar track having a small size with respect to one target is additionally generated;
a second phenomenon associated with a situation in which an unstable false roof lidar track is generated;
a third phenomenon associated with a situation in which two sensor fusion tracks having heading angles parallel to each other overlap each other; and
a fourth phenomenon associated with a situation in which two sensor fusion tracks having heading angles in opposite directions overlap each other, and
wherein the track deletion condition generation and storage unit is configured to generate and store a first track deletion condition corresponding to a function of deletion variables configured to indicate physical characteristics of a fusion track (FT1) and a roof lidar-only track (FT2) corresponding to each of the first to fourth phenomena, and a second track deletion condition corresponding to a deletion condition for a position of the fusion track satisfying the first track deletion condition.

2. The track mergence module according to claim 1, wherein:
data is generated by preprocessing sensed signals collected from a plurality of sensors, and
the plurality of sensor fusion tracks are acquired by predicting the data, determining association among the data acquired by the prediction, and then correcting the data after determining the association is terminated.

3. The track mergence module according to claim 1, wherein, in the first phenomenon, the first track deletion condition is represented by a following mathematical expression:

$$(A \cup B) \cap C \cap D \cap E,$$

wherein:
A is a deletion variable indicating a case that FT1 corresponds to a commercial vehicle also used as a passenger vehicle;
B is a deletion variable indicating a case that FT1 corresponds to a passenger vehicle or a commercial vehicle also used as a passenger vehicle, configured to have a height equal to or greater than 1.5 m;
C is a deletion variable indicating a case that FT2 is a combined roof lidar-only track;
D is a deletion variable indicating a case that FT2 has a length and a width which are equal to or less than 1 m; and
E is a deletion variable indicating a case that FT2 does not correspond to a pedestrian, a person riding a bicycle and a powered two wheeler.

4. The track mergence module according to claim 3, wherein the second track deletion condition is whether the FT2 satisfying the first track deletion condition is located in a comparison area generated by expanding FT1 by designated distances in a length direction and a width direction.

5. The track mergence module according to claim 1, wherein:
the unstable false roof lidar track is a track configured such that FT2 repeatedly appears and disappears due to a stationary object around a road, comprising one of a guardrail, a traffic cone, a traffic lane regulation rod, a bush and a tree; and
in the second phenomenon, the first track deletion condition is represented by a following mathematical expression:

$$A \cap B,$$

wherein A is a deletion variable indicating a case that FT1 is a combined roof lidar-only fusion track, and B is a deletion variable indicating a case that FT2 indicates that there are none of combined roof lidars.

6. The track mergence module according to claim 5, wherein the second track deletion condition is whether FT2 satisfying the first track deletion condition is located in a comparison area generated by expanding FT1 by designated distances in a length direction and a width direction.

7. The track mergence module according to claim 1, wherein, in the third phenomenon, the first track deletion condition is represented by a following mathematical expression:

$$(A \cap B \cap C) \cup (D \cap E \cap F),$$

wherein A is a deletion variable indicating a case that a longitudinal position of FT1>0, B is a deletion variable indicating a case that a longitudinal position of FT2≤ (the longitudinal position of the FT1+a length of FT1), C is a deletion variable indicating a case that the longitudinal position of FT2>the longitudinal position of FT1, D is a deletion variable indicating a case that the longitudinal position of FT1≤0, E is a deletion variable indicating a case that the longitudinal position of FT1≤(the longitudinal the position of FT2+a length of FT2), and F is a deletion variable indicating a case that the longitudinal position of FT1≥the longitudinal position of FT2,
wherein a longitudinal direction is equal to a driving direction of a vehicle.

8. The track mergence module according to claim 7, wherein the second track deletion condition is whether FT2 satisfying the first track deletion condition is located in a comparison area generated by expanding FT1 by designated distances in a length direction and a width direction.

9. The track mergence module according to claim 1, wherein, in the fourth phenomenon, the first track deletion condition is represented by a following mathematical expression:

$$A \cap B,$$

wherein A is a deletion variable indicating a case that an absolute longitudinal velocity of FT2≤0 and a heading angle of FT2 is between −40 degrees and 40 degrees, and B is a deletion variable indicating a case that the absolute longitudinal velocity of FT2>0 and (the heading angle of FT2≤140 degrees or the heading angle of FT2≥140 degrees), wherein the longitudinal velocity means a velocity in a driving direction of a host vehicle.

10. The track mergence module according to claim 9, wherein the second track deletion condition is whether FT2 satisfying the first track deletion condition is located in a comparison area generated by expanding FT1 by designated distances in a length direction and a width direction.

11. A track mergence method comprising:
generating track deletion conditions corresponding to a plurality of predetermined phenomena, respectively, and storing the generated track deletion conditions;
determining a phenomenon, among the plurality of predetermined phenomena, corresponding to a current situation by analyzing a plurality of received tracks;
retrieving the track deletion conditions corresponding to the determined phenomenon among the stored track deletion conditions corresponding to the phenomena; and
deleting a single track or a fusion track corresponding to the track deletion conditions,
wherein the phenomena comprises:
a first phenomenon associated with a situation in which a roof lidar track having a small size with respect to one target is additionally generated;
a second phenomenon associated with a situation in which an unstable false roof lidar track is generated;
a third phenomenon associated with a situation in which two sensor fusion tracks having heading angles parallel to each other overlap each other; and
a fourth phenomenon associated with a situation in which two sensor fusion tracks having heading angles in opposite directions overlap each other, and
wherein the track deletion conditions comprise:
a first track deletion condition corresponding to a function of deletion variables configured to indicate physical characteristics of a fusion track (FT1) and a roof lidar-only track (FT2) corresponding to each of the first to fourth phenomena; and
a second track deletion condition corresponding to a deletion condition for a position of the fusion track satisfying the first track deletion condition.

12. The track mergence method according to claim 11, wherein the fusion tracks are acquired by predicting data, generated by preprocessing sensed signals collected from a plurality of sensors, determining association among data acquired by the prediction, and then correcting the data after the determination as to the association is terminated.

13. The track mergence method according to claim 11, wherein, in the first phenomenon, the first track deletion condition is represented by a following mathematical expression, $$(A \cup B) \cap C \cap D \cap E,$$

wherein:
A is a deletion variable indicating a case that FT1 corresponds to a commercial vehicle also used as a passenger vehicle;
B is a deletion variable indicating a case that FT1 corresponds to a passenger vehicle or a commercial vehicle also used as a passenger vehicle, configured to have a height equal to or greater than 1.5 m;
C is a deletion variable indicating a case that FT2 is a combined roof lidar-only track;
D is a deletion variable indicating a case that FT2 has a length and a width which are equal to or less than 1 m; and
E is a deletion variable indicating a case that FT2 does not correspond to a pedestrian, a person riding a bicycle and a powered two wheeler.

14. The track mergence method according to claim 13, wherein the second track deletion condition is whether FT2 satisfying the first track deletion condition is located in a comparison area generated by expanding FT1 by designated distances in a length direction and a width direction.

15. The track mergence method according to claim 11, wherein:
the unstable false roof lidar track is a track configured such that FT2 repeatedly appears and disappears due to a stationary object around a road, comprising one of a guardrail, a traffic cone, a traffic lane regulation rod, a bush and a tree; and
in the second phenomenon, the first track deletion condition is represented by a following mathematical expression:

$$A \cap B,$$

wherein A is a deletion variable indicating a case that FT1 is a combined roof lidar-only fusion track, and B is a deletion variable indicating a case that FT2 indicates that there are none of combined roof lidars.

16. The track mergence method according to claim 15, wherein the second track deletion condition is whether FT2 satisfying the first track deletion condition is located in a comparison area generated by expanding FT1 by designated distances in a length direction and a width direction.

17. The track mergence method according to claim 11, wherein, in the third phenomenon, the first track deletion condition is represented by a following mathematical expression:

$$(A \cap B \cap C) \cup (D \cap E \cap F),$$

wherein A is a deletion variable indicating a case that a longitudinal position of FT1>0, B is a deletion variable indicating a case that a longitudinal position of FT2≤ (the longitudinal position of the FT1+a length of FT1), C is a deletion variable indicating a case that the longitudinal position of FT2>the longitudinal position of FT1, D is a deletion variable indicating a case that the longitudinal position of FT1<0, E is a deletion variable indicating a case that the longitudinal position of FT1≤(the longitudinal the position of FT2+a length of FT2), and F is a deletion variable indicating a case that the longitudinal position of FT1≥the longitudinal position of FT2,
wherein a longitudinal direction is equal to a driving direction of a vehicle.

18. The track mergence method according to claim 17, wherein the second track deletion condition is whether FT2 satisfying the first track deletion condition is located in a comparison area generated by expanding FT1 by designated distances in a length direction and a width direction.

19. The track mergence method according to claim 11, wherein, in the fourth phenomenon, the first track deletion condition is represented by a following mathematical expression:

$$A \cap B,$$

wherein A is a deletion variable indicating a case that an absolute longitudinal velocity of FT2≤0 and a heading angle of FT2 is between −40 degrees and 40 degrees, and B is a deletion variable indicating a case that the absolute longitudinal velocity of FT2>0 and (the heading angle of FT2≤140 degrees or the heading angle of FT2≥140 degrees), wherein the longitudinal velocity means a velocity in a driving direction of a host vehicle.

20. The track mergence method according to claim 19, wherein the second track deletion condition is whether FT2 satisfying the first track deletion condition is located in a comparison area generated by expanding FT1 by designated distances in a length direction and a width direction.

21. A non-transitory computer-readable recording medium having a program recorded thereon, the program to direct a processor to perform acts of:
  generating track deletion conditions corresponding to a plurality of predetermined phenomena, respectively, and storing the generated track deletion conditions;
  determining a phenomenon, among the plurality of predetermined phenomena, corresponding to a current situation by analyzing a plurality of received tracks;
  retrieving the track deletion conditions corresponding to the determined phenomenon among the stored track deletion conditions corresponding to the phenomena; and
  deleting a single track or a fusion track corresponding to the track deletion conditions
wherein the phenomena comprises:
  a first phenomenon associated with a situation in which a roof lidar track having a small size with respect to one target is additionally generated;
  a second phenomenon associated with a situation in which an unstable false roof lidar track is generated;
  a third phenomenon associated with a situation in which two sensor fusion tracks having heading angles parallel to each other overlap each other; and
  a fourth phenomenon associated with a situation in which two sensor fusion tracks having heading angles in opposite directions overlap each other, and
wherein the track deletion conditions comprise:
  a first track deletion condition corresponding to a function of deletion variables configured to indicate physical characteristics of a fusion track (FT1) and a roof lidar-only track (FT2) corresponding to each of the first to fourth phenomena; and
  a second track deletion condition corresponding to a deletion condition for a position of the fusion track satisfying the first track deletion condition.

* * * * *